Jan. 7, 1941. W. C. HILLMAN ET AL 2,227,582
CLUTCH, PARTICULARLY SUITABLE FOR MACHINE TOOL HOLDERS
Filed Jan. 10, 1939
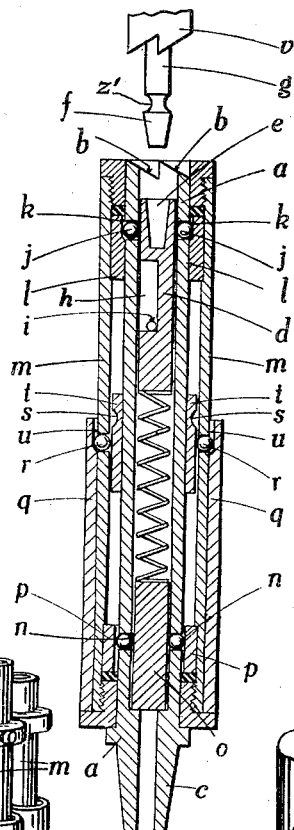
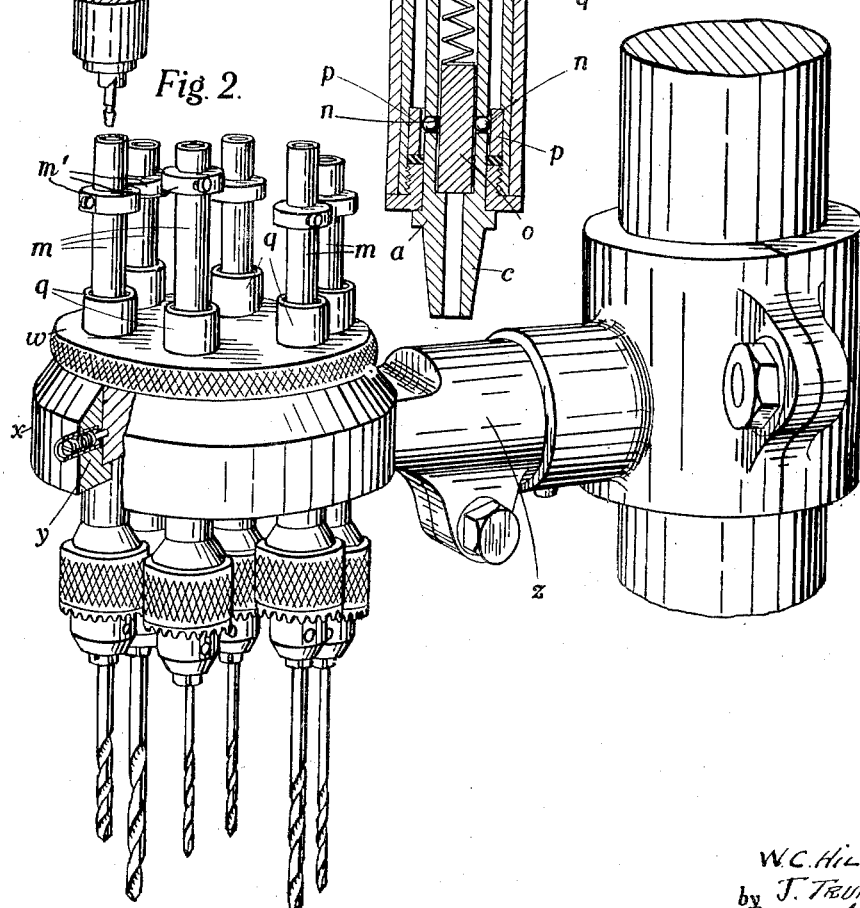
Inventors
W. C. Hillman
by J. Trumble.
Attorneys Patented Jan. 7, 1941

2,227,582

UNITED STATES PATENT OFFICE 2,227,582

CLUTCH PARTICULARLY SUITABLE FOR MACHINE TOOL HOLDERS

William Charter Hillman and John Trumble, London, England

Application January 10, 1939, Serial No. 250,240
In Great Britain January 7, 1938

8 Claims. (Cl. 77—25)

This invention relates to clutches particularly suitable for a machine tool holder for use in a machine tool such as a lathe and machines for drilling, tapping, milling, broaching, grinding, polishing, reaming, driving screws and other operations capable of being performed with either a rotating or non-rotating tool.

One of the objects of the present invention is to provide a machine tool holder of the above character having improved quick-release means for engaging the tool and which may either be used singly or collectively as in a turret or a multi-spindle tool head.

A further object of the invention is to provide a multi-spindle tool head in which the tool spindles are rotated by selective engagement by or with one or more drill or other driving spindles so that the remaining spindle or spindles is or are stationary.

Broadly the present invention consists of a clutch particularly suitable for a machine tool holder which comprises a tubular member, one or more detents mounted to have free lateral movement within one or more openings in the wall of the tubular member, a spring pressed plunger disposed within said tubular member and serving normally to hold said one or more detents in their outward position, and a sleeve slidably mounted on the tubular member, the whole being adapted to co-operate with a rod-like member which is insertable within the tubular member firstly to displace the spring pressed plunger and allow the one or more detents to move inwards and engage one or more recesses in the rod-like member and secondly to effect a driving engagement between clutch means associated in part with the rod-like member and in part with the upper end of the tubular member and then to produce relative longitudinal movement between the tubular member and the sleeve to cause the sleeve to enclose the one or more detents and hold the same in locked engagement with the rod-like member.

Each tool spindle is, preferably, so constructed that the same is automatically locked against longitudinal movement each time the same is returned to its fully raised position, and automatically released as each driving connection with the drill spindle is made.

This may be effected by providing one or more further detents which are mounted to have free lateral movement within one or more openings in the sleeve said further one or more detents being constrained to move inwards and provide a locked engagement between the sleeve and the tubular member as a result of two relative longitudinal movements, the first between the tubular member and the sleeve to allow the one or more detents to move inwards into engagement with a recess or groove associated with the tubular member and the second between the tubular member and the sleeve moving in unison and a further and stationary sleeve surrounding the movable sleeve, said stationary sleeve serving, as a result of said second relative movement, to enclose the said further one or more detents and hold the same in locked engagement with the tubular member.

The invention also consists of a multi-spindle tool head which comprises a plurality of separate tool spindles as above set forth mounted to have independent and relative rotary and longitudinal movement within the tool head each such tool spindle having means at one end for engaging a tool the clutch means at the opposite end being for selective engagement by the rod-like member which then forms part of a common driving or drill spindle.

In a tool holder according to the present invention the tool to be held is connected with the aforesaid tubular member.

A practical example of a tool holder according to this invention, in which the insertable rod-like member forms part of the driving or drill spindle of a machine tool, will hereafter be described in connection with one embodiment of a multi-spindle tool head according to this invention.

In this embodiment the tool head is adapted to be mounted on a conventional drilling machine so as to have a movement which permits the upper or clutch end of each selected tool spindle to be brought into alignment with the usual drill spindle of the drilling machine, so that upon moving such drill spindle downwards whilst the same is rotating, a clutch member on its lower end is caused to engage the corresponding clutch member on the upper end of the selected tool spindle and impart rotation to such spindle, whilst on continued downward movement of the spindle the engaged tool spindle moves with it and thus feeds the tool into the work.

In order that the invention may be clearly understood and carried into effect its application as a machine tool holder and such tool holder's use in a multi-spindle tool head will now be described, by way of example, by aid of the accompanying drawing in which:

Fig. 1 is a vertical section through a tool holder according to one embodiment of this invention.

Fig. 2 is a perspective view illustrating the use of the tool holder shown in Fig. 1, in a multi-spindle tool head.

The tool holder illustrated in Fig. 1 consists of a rotatable tubular member $a$ having clutch teeth $b$ at its upper end and a coned spigot $c$ at its lower end for driving engagement with a tool chuck, not shown in this figure.

Slidably mounted within the tubular member and supported in the raised position shown, is a plunger $d$ which is recessed as at $e$ for the reception of the conical depending portion $f$ of a rod-like member $g$ and formed at one side with a cut-out or slot $h$ for the reception of a transverse stop pin $i$.

Mounted to have free lateral movement within openings in the wall of the tubular member near its upper end are ball detents $j$. These detents are held in the outward position shown by the obtruding upper end of the plunger $d$ in which outward position they project into a clearance $k$ provided by an enlarged circular recess in the upper open end of an annular hardened bearing ring $l$ carried by and disposed within a sleeve $m$.

The ball detents $j$ in conjunction with the bearing ring $l$ form a ball bearing for the upper end of the tubular member. A similar bearing is provided for the lower end by means of further balls $n$ which are maintained in position within openings in the wall of the tubular member, on the inside by a fixed rod-like abutment $o$ and on the outside by an encircling hardened annular ring $p$ which is carried by and disposed within the sleeve $m$ similarly to the upper bearing ring $l$.

Surrounding the lower end of the sleeve $m$ is a further and stationary sleeve $q$. This stationary sleeve serves the dual function of a bearing for the slidable reception of the sleeve $m$ and a means for holding a further set of ball detents $r$ in locked engagement with a groove $s$ formed in and around a ring $t$ mounted on the exterior of or integral with the tubular member $a$ at or about its middle. These further ball detents $r$ are mounted to have free lateral movement within openings in the wall of the sleeve $m$. In the raised position of the sleeve $m$ shown in the figure, these ball detents are held in their outward position by contact with the plain portion of the ring $t$, in which outward position they partially project into a space provided by an enlarged circular opening or mouth $u$ in the upper end of the stationary sleeve $q$ and thus serve to hold the sleeve $m$ in its raised position.

To operate the tool holder shown the rod-like member $g$ is lowered to bring its conical portion $f$ into the recess $e$ in the spring supported plunger $d$ to impart initial rotation to enable the dogs to engage without impact. The continued downward movement of the rod-like member, which may form part of the driving or drill spindle of a drilling machine, serves to depress the plunger $d$ against its spring until the plunger moves clear of the ball detents $j$ and the same come into registration with a continuous groove $Z'$ in the rod-like member just above the conical depending portion $f$. When this position is attained the clutch teeth $b$ at the upper end of the tubular member $a$ have entered into engagement with corresponding clutch teeth $v$ associated with the rod-like member $g$ and the further detents $r$ are in registration with the groove $s$ in the ring $t$.

The tubular member $a$ is now rotated as a result of the aforesaid clutch engagement and continued downward movement of the rod-like member now produces a corresponding downward movement of the freed sleeve $m$. This downward movement of the sleeve $m$ is utilised to feed into the work any drill or other tool which is carried by the lower end of the tubular member $a$.

The parts of the tool holder are returned to their normally raised position with corresponding movement of the rod-like member as a result of the locked engagement afforded by the detents $j$. When the parts have returned to the position shown in the drawing the rod-like member becomes automatically disengaged from the tool holder.

In using the tool holder above described as part of the multi-spindle tool head illustrated in Fig. 2 the same are arranged in number required, as a concentric circle within a carrier head $w$ the engagement therewith being effected by forcing the stationary sleeve $q$ of each into a hole bored for its reception in the carrier head. The head is now positioned within a supporting ring $x$ in which it is rotatable so as to bring each spindle in turn beneath the drill spindle which carries the operating rod-like member $g$. The head is retained in each drilling position by means of a hand operated spring pressed detent $y$. The supporting ring $x$ is carried by an adjustable or other bracket $z$ and this in turn engages a suitable fixed part of the drilling machine.

A multi-spindle tool head according to the present invention is also a multi-purpose tool whereas the conventional form of tool of this character is usually constructed for a particular job and is therefor useless for all but that job. For this reason the improved tool head may be adopted as a standard tool in even the smaller workshops.

If desired the outer sleeve may be provided with a collar $m'$ which is adjustable to enable a tool in a drilling or like operation to be fed into the work to any predetermined extent such collar being adapted to be locked in an adjusted position on the sleeve and to abut against a stationary surface when the tool has been fed the desired amount into the work.

The feature of the quick-release coupling has other useful applications in addition to that hereinbefore described. For example it may be used as part of a clutch to provide a disconnectable driving connection between two shafts, and such further applications are intended to be comprised within the ambit of the present invention.

What we claim is:

1. A clutch particularly suitable for a machine tool holder comprising a tubular member having openings in its walls, detents mounted to have lateral movement within said openings, a plunger disposed longitudinally within said tubular member, a spring supporting the plunger therein, whereby said plunger when in raised position holds said detents in their outward position, an outer member having openings in its wall within which said tubular member is slidably mounted, further detents mounted to have lateral movement within said openings in the wall of the outer member, and a stationary sleeve within which said outer member is slidably mounted, said plunger and said tubular member being displaceable by a separate driving or operating member when said latter member is inserted within the tubular member, to free said detents and permit the same to be moved inwards into locking engagement with said driving or operating member by said outer member when said tubular member is moved relatively thereto by said driving or operating member and subsequently to produce longitudinal movement of the outer member relatively to the stationary sleeve and in consequence a locked engagement between said tubular member and said outer member by said further detents.

2. A clutch particularly suitable for a machine tool holder comprising a tubular member having openings in its walls and having clutch teeth on its outer end, detents mounted to have lateral movement within said openings, a plunger having a recess in its outer end and disposed longitudinally within said tubular member, a spring supporting the plunger therein, whereby the plunger when in raised position holds said detents in their outward position, and an outer member within which said tubular member is slidably mounted, a separate driving member adapted to displace said plunger when said latter member is inserted in the tubular member to free said detents and permit the same to be moved into locking engagement with said driving member by said outer member when said tubular member is moved relatively thereto by said driving or operating member, said driving member having a projecting portion for frictionally engaging within the recess in the plunger and clutch teeth complementary to the clutch teeth on the tubular member, the said frictional engagement effecting initial rotation of the tubular member to facilitate the interengagement of said two sets of clutch teeth.

3. A machine tool holder comprising in combination a driving member mounted for rotative and longitudinal displacement and having a projection at its end, and clutch means adjacent its end, a tubular tool feeding member having at one end tool holding means and at the other end clutch means corresponding to and for selective engagement by the clutch means on the driving member, the projection of the driving means being displaceable within the wall of the tubular feeding member, an outer member within which the tubular tool feeding member is slidably mounted, openings in the wall of the tubular feeding member, detents of greater width than the walls of the tubular tool feeding member mounted to have lateral movement within the openings of said feeding member, a groove in the inner periphery of the outer member, and a groove in the outer periphery of the projection on the driving member, resilient means serving to urge the detents outwardly of the openings in the tubular tool feeding member and into engagement with the groove in the outer member, thereby to lock the tubular tool feeding member and the outer member against relative longitudinal movement, said resilient means being displaceable by the driving member as the latter is rotatively and longitudinally moved into clutch locking and driving engagement with the tubular feeding member for releasing the pressure thereof against the detents, whereby the tubular tool feeding member is released from locked relationship with the outer member, said detents being laterally urged into the peripheral groove of the projection as the projection is further displaced into the tubular tool feeding member, for locking said tool feeding member to said driving member against relative longitudinal movement as the driving member continues in its rotatable and longitudinal movement.

4. A machine tool holder comprising in combination a tubular tool feeding member having clutch means at one end and tool holding means at the other end, a driving member having clutch means adjacent its ends for selective engagement with the clutch means on the tubular tool feeding member, and having a head portion slidable within the tubular tool feeding member, an outer member within which the tubular tool feeding member is slidably mounted, detents mounted for lateral movement exteriorly and interiorly of the wall of the tubular tool feeding member, annular grooves respectively on the interior periphery of the outer member and on the exterior periphery of the driving member head, resilient means mounting said detents to normally maintain the same in engagement between the tubular tool feeding member and the inner periphery of the outer member, thereby to prevent longitudinal movement between the tool feeding member and the outer member, said resilient means being displaced by the head of the driving member as the same is urged into the tubular tool feeding member, thereby to free the detents from locking position within the inner peripheral groove of the outer member, said detents being movable into the outer peripheral groove on the head of the driving member, as the tubular tool feeding member and driving member in clutched engagement are longitudinally moved through the outer member, thereby to lock the driving member to the tubular tool feeding member against relative longitudinal movement.

5. A machine tool holder comprising in combination a tubular tool feeding member having clutch means at one end and tool holding means at the other end, a driving member having clutch means adjacent its ends for selective engagement with the clutch means on the tubular tool feeding member, and having a head portion slidable within the tubular tool feeding member, an outer member within which the tubular tool feeding member is slidably mounted, detents mounted for lateral movement exteriorly and interiorly of the wall of the tubular tool feeding member, annular grooves respectively on the interior periphery of the outer member and on the exterior periphery of the driving member head, resilient means mounting said detents to normally maintain the same in engagement between the tubular tool feeding member and the inner periphery of the outer member, thereby to prevent longitudinal movement between the tool feeding member and the outer member, said resilient means being displaced by the head of the driving member as the same is urged into the tubular tool feeding member, thereby to free the detents from locking position within the inner peripheral groove of the outer member, said detents being movable into the outer peripheral groove on the head of the driving member, as the tubular tool feeding member and driving member in clutched engagement are longitudinally moved through the outer member, thereby to lock the driving member to the tubular tool feeding member against relative longitudinal movement, a stationary sleeve within which the outer member is slidably mounted, and further locking means normally to engage both the outer member and stationary sleeve to prevent longitudinal movement of the outer member relative to the sleeve, the first mentioned locking means being released from engagement with the outer member by the driving member in its longitudinal and rotative movement, whereby the clutch means thereof enters into engagement with the clutch means on the tubular tool feeding member, and the second mentioned locking means being released by the tubular tool feeding member in its movement relative to the outer member following the release of the first mentioned locking means.

6. A machine tool holder comprising in combination a driving member mounted for rotative and longitudinal movement and having clutch means adjacent to, and a projection at, its end, a tubular tool feeding member having at one end tool holding means and at the other end clutch means for selective engagement by the clutch means of the driving member, the projection of the driving means being movable within the wall of the tubular tool feeding member, an outer member within which the tool feeding member is slidably mounted, an annular groove in the inside wall of the outer member, openings in the wall of the tubular tool feeding member, detents mounted to have lateral movement within said openings, a plunger disposed longitudinally within said tubular tool feeding member, and a spring serving to support said plunger in a position whereby said plunger urges said detents outwardly away from the tubular tool feeding member and into engagement with the groove in the inside wall of the outer member, thereby to lock the tubular tool feeding member with the outer member against longitudinal movement, the plunger being longitudinally displaced against its supporting spring by the projection on the driving member as the latter is longitudinally moved towards the tubular tool feeding member, thereby to free the detents and permit the same to move inwards out of engagement with the groove in the outer member, for releasing the tubular tool feeding member from locking engagement with the outer member, the clutch means on the driving member and the tubular tool feeding member being engaged upon the longitudinal and rotative movement of the driving member, whereby said tubular tool feeding member is locked into driving engagement with the driving member for downward movement through the outer member, and means actuable as the said tubular tool feeding member and the driving member move further downwardly through said outer member after the longitudinal displacement of the spring supported plunger by the driving member in its downward movement for locking the tubular tool feeding member and the driving member against relative longitudinal movement in either direction.

7. A machine tool holder comprising in combination a driving member mounted for rotative and longitudinal movement and having clutch means adjacent to, and a projection at, its end, a tubular tool feeding member having at one end tool holding means and at the other end clutch means for selective engagement by the clutch means of the driving member, the projection of the driving means being movable within the wall of the tubular tool feeding member, an outer member within which the tool feeding member is slidably mounted, an annular groove in the inside wall of the outer member, openings in the wall of the tubular tool feeding member, detents mounted to have lateral movement within said openings, a plunger disposed longitudinally within said tubular tool feeding member, and a spring serving to support said plunger in a position whereby said plunger urges said detents outwardly away from the tubular tool feeding member and into engagement with the groove in the inside wall of the outer member, thereby to lock the tubular tool feeding member with the outer member against longitudinal movement, the plunger being longitudinally displaced against its supporting spring by the projection on the driving member as the latter is longitudinally moved towards the tubular tool feeding member, thereby to free the detents and permit the same to move inwards out of engagement with the groove in the outer member, for releasing the tubular tool feeding member from locking engagement with the outer member, an annular groove on the projection of the driving member and means actuable as the tubular tool feeding member and driving member move through said outer member, for displacing the detents laterally of the wall of the tubular tool feeding member and into the annular groove of the projection of the driving member for locking the tubular tool feeding member and driving member against relative longitudinal movement in either direction.

8. A machine tool holder comprising in combination a driving member mounted for rotative and longitudinal movement and having a conical head and clutch means thereadjacent, a tubular tool feeding member having at one end tool holding means and at the opposite end a conical recess cooperating with the conical head, and clutch means thereadjacent for engagement by the corresponding clutch means on the driving member, an outer member within which the tubular tool feeding member is slidably mounted, locking means serving normally to engage the tubular tool feeding member and the outer member to prevent relative longitudinal movement therebetween, said locking means being released from the locking engagement aforesaid by the driving member in its movement, the conical head and clutch means of the driving member upon longitudinal and rotative movement of said driving member being brought respectively and successively into friction and driving engagement with the corresponding conical recess and clutch means of the tubular tool feeding member, whereby the tool feeding member is rotated and longitudinally displaced through the outer member by and with said driving member.

WILLIAM CHARTER HILLMAN.
JOHN TRUMBLE.